UNITED STATES PATENT OFFICE.

WILLIAM C. ARSEM AND JAMES G. E. WRIGHT, OF SCHENECTADY, NEW YORK, ASSIGNORS TO GENERAL ELECTRIC COMPANY, A CORPORATION OF NEW YORK.

PROCESS FOR MAKING SILICIC ACID OR HYDRATED SILICA.

1,270,093. Specification of Letters Patent. Patented June 18, 1918.

No Drawing. Application filed August 23, 1917. Serial No. 187,739.

*To all whom it may concern:*

Be it known that we, WILLIAM C. ARSEM, a citizen of the United States, residing at Schenectady, in the county of Schenectady, State of New York, and JAMES G. E. WRIGHT, a subject of the King of Great Britain, residing at Schnectady, in the county of Schenectady, State of New York, have invented certain new and useful Improvements in Processes for Making Silicic Acid or Hydrated Silica, of which the following is a specification.

Our present invention comprises a process for making silicic acid in the form of a light voluminous powder or finely granulated mass, suitable particularly for fuse filler, as set forth in U. S. Patent No. 1,157,919, October 26, 1915.

In carrying out our invention a compound of silica and ammonia, which may be termed hydrated ammonium silicate, is first formed. This silicate by decomposition splits off ammonia leaving silicic acid, or hydrated silica, of a finely granular, non-colloidal character. A preferred process of carrying out our invention is as follows:

A solution of commercial water glass is added with constant agitation to a solution of an ammonium salt, preferably ammonium chlorid. Although concentrations of the two solutions may be varied somewhat, we prefer to prepare the water glass, which is a silicate of sodium or potassium, by adding one part of the water glass of about 1.45 specific gravity to three parts of water by weight. The solution of ammonium chlorid is prepared by adding one part of ammonium chlorid to about eight parts of water by weight. When using other compounds of ammonium, for example, ammonium bromid, nitrate, sulfate or acetate, allowance should of course be made for the different molecular weight so as to prepare a solution having about the same molecular content of $NH_3$. The water glass solution should be added to the solution of ammonium salt at room temperature. As a result of the mixture of the two solutions in the manner stated a fine granular precipitate is formed which may be represented by the formula $SiO_2.NH_3.H_2O$, which therefore may be termed a hydrated ammonium silicate. The mixture containing the above ammonium silicate is then heated to the boiling point, for example, by blowing in steam, thereby splitting off ammonia and converting the silicate into silicic acid, or hydrated silica, of the same fine grained character. After cooling, the mixture is filtered and the precipitate washed until the wash water is practically free from chlorids. The precipitate of silicic acid is then dried at a temperature of about 100 to 150° C. and finally put through a 20 or 40 mesh sieve to remove coarser particles. The product contains approximately 15% of combined or absorbed water and one gram will occupy a volume of from 2 to 5 cc. when shaken down.

In some cases the hydrated ammonium silicate may be filtered directly after precipitation in the cold. Upon being thoroughly washed it may be immediately subjected (that is without boiling) to a temperature of about 150° C. thereby decomposing the same with the evolution of the ammonia and drying at the same time.

What we claim as new and desire to secure by Letters Patent of the United States, is:—

1. The process of preparing silicic acid which consists in forming a silicate of ammonium and decomposing said silicate to split off ammonia, leaving silicic acid.

2. The process of preparing silicic acid which consists in adding a solution of a silicate to a solution of an ammonium salt, and heating the resulting precipitate.

3. The process of preparing silicic acid which consists in adding to a solution of ammonium chlorid a solution of a silicate of an alkali metal, removing the resulting precipitate, purifying the same and drying at an elevated temperature.

4. The process of preparing silicic acid as a fine voluminous powder which consists in adding an aqueous solution of silicate of alkali metal to a solution of an ammonium salt at room temperature and heating the mass to form silicic acid by decomposition.

5. The process of preparing silicic acid as a fine voluminous powder which consists in adding at room temperature a solution consisting of one part of commercial water glass and three parts of water by weight to a second solution consisting of one part of ammonium chlorid and eight parts of water by weight, heating the mass to boiling to form silicic acid by decomposition, cooling the mixture, filtering the precipitate, washing to remove chlorids and drying the precipitate at about 100 to 150° C.

In witness whereof, we have hereunto set our hands this 21st day of August, 1917.

WILLIAM C. ARSEM,
JAMES G. E. WRIGHT.